(12) United States Patent
Fan (10) Patent No.: US 10,728,486 B2
(45) Date of Patent: Jul. 28, 2020

(54) SMART TELEVISION PLAYING METHOD AND DEVICE

(71) Applicant: SHENZHEN SKYWORTH-RGB ELECTRONIC CO., LTD., Shenzhen, Guangdong (CN)

(72) Inventor: Yanbo Fan, Guangdong (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 16/313,050

(22) PCT Filed: Oct. 5, 2017

(86) PCT No.: PCT/CN2017/070278
§ 371 (c)(1),
(2) Date: Dec. 23, 2018

(87) PCT Pub. No.: WO2018/006581
PCT Pub. Date: Jan. 11, 2018

(65) Prior Publication Data
US 2019/0222793 A1    Jul. 18, 2019

(30) Foreign Application Priority Data
Jul. 7, 2016   (CN) .......................... 2016 1 0539072

(51) Int. Cl.
*G06F 3/00* (2006.01)
*G06F 9/44* (2018.01)
(Continued)

(52) U.S. Cl.
CPC ....... *H04N 5/44513* (2013.01); *H04N 5/4403* (2013.01); *H04N 5/60* (2013.01);
(Continued)

(58) Field of Classification Search
CPC .................................................. H04N 5/44513
(Continued)

(56) References Cited

U.S. PATENT DOCUMENTS 8,893,225 B2   11/2014   Aciicmez et al.
9,736,522 B2   8/2017    Kim et al.
(Continued)

FOREIGN PATENT DOCUMENTS

CN   102413297 A   4/2012
CN   102421028 A   4/2012
(Continued)

OTHER PUBLICATIONS

International Search Report of PCT Patent Application No. PCT/CN2017/070278 dated Mar. 30, 2017.

*Primary Examiner* — Timothy A Mudrick (57) ABSTRACT

Disclosed are a smart television playing method and a smart television playing device, applied to a smart television of the WebKit-based WebOS, the smart television playing method including: when the smart television is turned on, starting a WebKit kernel process based on a Linux kernel and a driver layer; starting a state management daemon to detect a control command received by the smart television; and sending the control command to a daemon corresponding to the control command via the WebKit kernel process, allowing the daemon to perform control operation corresponding to the control command.

10 Claims, 6 Drawing Sheets

S110 — when the smart television is turned on, starting a WebKit kernel process based on the Linux kernel and a driver layer S120 — starting a state management daemon to detect a control command received by the smart television S130 — sending the control command to a daemon corresponding to the control command via the WebKit kernel process, allowing the daemon to perform control operation corresponding to the control command (51) Int. Cl.

| | | |
|---|---|---|
| G06F 9/46 | (2006.01) | |
| G06F 13/00 | (2006.01) | |
| H04N 5/445 | (2011.01) | |
| H04N 21/472 | (2011.01) | |
| H04N 21/4782 | (2011.01) | |
| H04N 21/439 | (2011.01) | |
| H04N 21/426 | (2011.01) | |
| H04N 21/443 | (2011.01) | |
| H04N 5/44 | (2011.01) | |
| H04N 5/60 | (2006.01) | |
| H04N 21/81 | (2011.01) | |

(52) U.S. Cl.
CPC ......... *H04N 21/426* (2013.01); *H04N 21/439* (2013.01); *H04N 21/443* (2013.01); *H04N 21/4438* (2013.01); *H04N 21/472* (2013.01); *H04N 21/4782* (2013.01); *H04N 21/8173* (2013.01); *H04N 2005/44517* (2013.01)

(58) Field of Classification Search
USPC .......................................................... 719/313
See application file for complete search history.

(56) References Cited

U.S. PATENT DOCUMENTS

| | | | |
|---|---|---|---|
| 2013/0097654 | A1 | 4/2013 | Aciicmez et al. |
| 2015/0229987 | A1* | 8/2015 | Kim .................. H04N 21/4316 725/34 |
| 2015/0256874 | A1 | 9/2015 | Kim et al. |

FOREIGN PATENT DOCUMENTS

| | | |
|---|---|---|
| CN | 102651731 A | 8/2012 |
| CN | 103092654 A | 5/2013 |
| CN | 103514924 A | 1/2014 |
| CN | 104902290 A | 9/2015 |
| CN | 106101836 A | 11/2016 |
| EP | 2581853 A2 | 4/2013 |

* cited by examiner

SMART TELEVISION PLAYING METHOD AND DEVICE

FIELD

The present disclosure relates to the field of communication, and more particularly relates to a smart television playing method and a smart television playing device.

BACKGROUND

Currently, most of smart televisions developed by television manufactures are based on Android system. The Android system is now mature and stable, and a lot of native applications have been developed based on the Android system. The native applications of the Android system are almost developed by Java technology, and run in a Dalvik virtual machine or a Java virtual machine. During the running process, the native applications commonly have a high demand for CPU, memory, and so on.

However, with a rapid iterative update of the Android system and applications thereof, the hardware configuration of the smart television is difficult to support a fluent running of the updated Android system and applications due to a hysteretic update of the hardware configuration of the smart television, which results in that the playing of multimedia files of the smart television is not fluent enough.

SUMMARY

It is one main object of the present disclosure to provide a smart television playing method and a smart television playing device, aiming to solve the technical problem in the prior art that the playing of multimedia files of the smart television is not fluent enough with the rapid iterative update of the Android system and applications thereof.

In order to realize the above aim, the present disclosure provides a smart television playing method, which is applied to a smart television of the WebKit-based WebOS, the method includes the following steps:

when the smart television is turned on, starting a WebKit kernel process based on the Linux kernel and a driver layer;

starting a state management daemon to detect a control command received by the smart television; and sending the control command to a daemon corresponding to the control command via the WebKit kernel process, allowing the daemon to perform control operation corresponding to the control command.

In an exemplary embodiment, the display interface of the smart television is a control interface displayed as a Web page, the step of sending the control command to a daemon corresponding to the control command via the WebKit kernel process, allowing the daemon to perform control operation corresponding to the control command includes:

when the control command is a play command of an online multimedia file triggered based on the control interface, sending a play parameter of the multimedia file corresponding to the play command to a player daemon via the WebKit kernel process calling a play interface of a player, allowing the player daemon to parse the play parameter; and when the play parameter parsed by the player daemon is received, playing the multimedia file based on the parsed play parameter.

In an exemplary embodiment, the display interface of the smart television is a control interface displayed as a Web page, the step of sending the control command to a daemon corresponding to the control command via the WebKit kernel process, allowing the daemon to perform control operation corresponding to the control command includes:

when the control command is a play command of a shared multimedia file triggered based on the control interface, sending a play parameter of the shared multimedia file corresponding to the play command to an agent process via the WebKit kernel process calling a play interface of a player, allowing the agent process to parse the play parameter and send the parsed play parameter to a player daemon; and when the player daemon receives the play parameter parsed by the agent process, playing the shared multimedia file according to the parsed play parameter.

In an exemplary embodiment, the step of sending the control command to a daemon corresponding to the control command via the WebKit kernel process, allowing the daemon to perform control operation corresponding to the control command includes:

when the control command is a volume adjustment command, sending the volume adjustment command to a system daemon via the WebKit kernel process; and when the system daemon receives the volume adjustment command, adjusting the volume of the smart television based on a volume adjustment parameter corresponding to the volume adjustment command.

In an exemplary embodiment, the step of sending the control command to a daemon corresponding to the control command via the WebKit kernel process, allowing the daemon to perform control operation corresponding to the control command includes:

when the control command is a playback progress adjustment command, sending the playback progress adjustment command to a dispatch daemon via the WebKit kernel process, allowing the dispatch daemon, when determining that the smart television is currently in a playing status, to send the playback progress adjustment command to a system daemon; and when the system daemon receives the playback progress adjustment command, adjusting progress of the multimedia file currently played in the smart television based on a playback progress adjustment parameter corresponding to the playback progress adjustment command.

In addition, in order to realize the above aim, the present disclosure also provides a smart television playing device, which is applied to a smart television of WebKit-based WebOS, the smart television playing device includes:

a first starting module, configured to, when the smart television is turned on, start a WebKit kernel process based on the Linux kernel and a driver layer, and display a control interface of the smart television as a Web page;

a second starting module, configured to start a state management daemon to detect a control command received by the smart television; and a sending module, configured to send the control command to a daemon corresponding to the control command via the WebKit kernel process, allowing the daemon to perform control operation corresponding to the control command.

In an exemplary embodiment, the display interface of the smart television is a control interface of the smart television displayed as a Web page, the sending module includes:

a first sending unit, configured to, when the control command is a play command of an online multimedia file triggered based on the control interface, send a play parameter of the multimedia file corresponding to the play command to a player daemon via the WebKit kernel process calling a play interface of a player, allowing the player daemon to parse the play parameter; and a first playing unit, configured to, when the play parameter parsed by the player daemon is received, playing the multimedia file based on the parsed play parameter.

In an exemplary embodiment, the display interface of the smart television is a control interface of the smart television displayed as a Web page, the sending module includes:

a second sending unit, configured to, when the control command is a play command of a shared multimedia file triggered based on the control interface, send a play parameter of the shared multimedia file corresponding to the play command to an agent process via the WebKit kernel process calling a play interface of a player, allowing the agent process to parse the play parameter and send the parsed play parameter to a player daemon; and a second playing unit, configured to, when the player daemon receives the play parameter parsed by the agent process, play the shared multimedia file according to the parsed play parameter.

In an exemplary embodiment, the sending module includes:

a third sending unit, configured to, when the control command is a volume adjustment command, send the volume adjustment command to a system daemon via the WebKit kernel process; and a volume adjustment unit, configured to, when the system daemon receives the volume adjustment command, adjust the volume of the smart television based on a volume adjustment parameter corresponding to the volume adjustment command.

In an exemplary embodiment, the sending module includes:

a fourth sending unit, configured to, when the control command is a playback progress adjustment command, send the playback progress adjustment command to a dispatch daemon via the WebKit kernel process, allowing the dispatch daemon, when determining that the smart television is currently in a playing status, to send the playback progress adjustment command to a system daemon; and a progress adjustment unit, configured to, when the system daemon receives the playback progress adjustment command, adjust progress of the multimedia file currently played in the smart television based on a playback progress adjustment parameter corresponding to the playback progress adjustment command.

In accordance with the present disclosure, when the smart television is turned on, it's first to start a WebKit kernel process based on the Linux kernel and the driver layer, next to start an IR daemon to detect a control command received by the smart television, then via the WebKit kernel process, to send the control command to a daemon corresponding to the control command, so as for the daemon to perform control operations corresponding to the control command. This realizes play control via the WebKit kernel process sending the control command to the corresponding daemon, making it possible for the smart television adopting the WebKit-based WebOS to be without a middle layer, and improving the playing fluency of multimedia files of the smart television.

The realizing of the aim, functional characteristics and advantages of the present disclosure are further described in detail with reference to the accompanying drawings and the embodiments.

DETAILED DESCRIPTION OF THE EMBODIMENTS

It will be appreciated that the specific embodiments described herein are merely illustrative of the present disclosure and are not intended to limit the present disclosure.

The present disclosure provides a smart television playing method.

Figure 1:
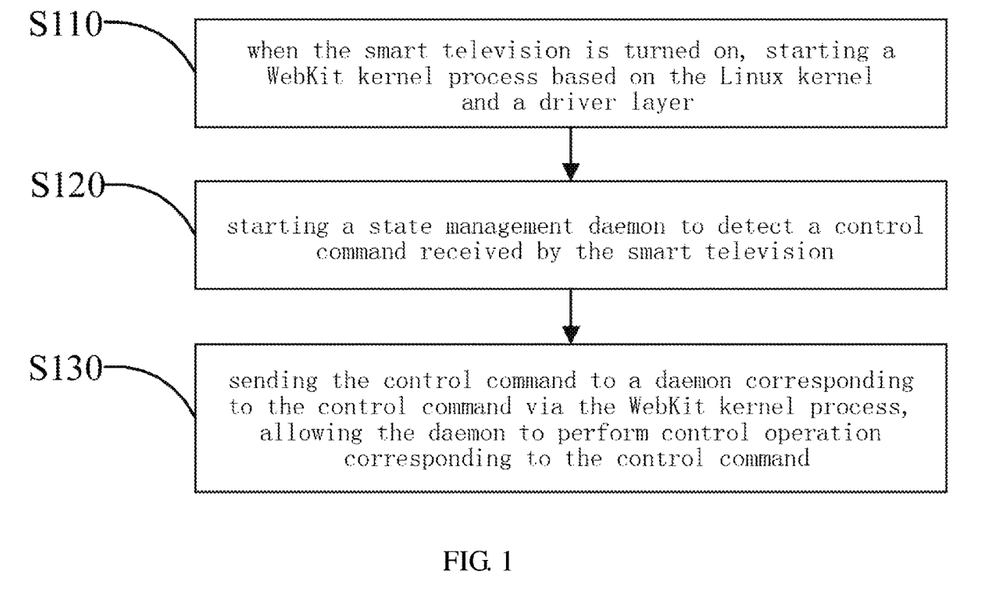
FIG. 1 is an illustrative flowchart of a first embodiment of a smart television playing method according to this disclosure.

Referring to FIG. 1, FIG. 1 is an illustrative flowchart of a first embodiment of a smart television playing method according to this disclosure.

In the exemplary embodiment, the smart television playing method is applied to a smart television of the WebKit-based WebOS. The WebKit is an open source browser engine, based on which the WebOS (embedded operating system) of the smart television can be designed to implement. The WebOS is presented by means of Web pages to users of the smart television. All interactions of a user on the television, and all the use of functions are performed by the Web.

The smart television playing method includes the following steps:

S110, when the smart television is turned on, starting a WebKit kernel process based on the Linux kernel and a driver layer;

When the smart television is turned on, the Linux kernel is started, and an initialization process is started to mount the necessary file system, and to start system services or daemons. By the initialization process, a WebKit kernel process is started, which is served as an intermediate interface for communication between the upper user space or applications and the system kernel.

In the exemplary embodiment, a state management daemon IR daemon is started to capture the key value of a remote in real time. A web page of the control interface is displayed on the display interface of the smart television, the web page including options for switching selections, clarities, play sources and so on. Users can trigger a play command of a multimedia file by limiting the option such as the switching selections or play sources and so on. The IR daemon determines whether the key value is the play command of the multimedia file according to the captured key value.

S120, starting a state management daemon to detect a control command received by the smart television;

The state management daemon IR daemon is started to detect the control command input by a control terminal. Specifically, the IR daemon is configured to capture the key value input by a button of a remote, keyboard or smart television in real time, and determine the corresponding control command according to the received key value.

S130, sending the control command to a daemon corresponding to the control command via the WebKit kernel process, allowing the daemon to perform control operation corresponding to the control command.

Specifically, when the control command is a play command of an online multimedia file, the control command is sent to a player daemon via the WebKit kernel process, in order to realize playing of the online multimedia file; when the control command is a volume adjustment command, the volume adjustment command is sent to a system daemon via the WebKit kernel process, in order to realize volume adjustment of the smart television; when the control command is a playback progress adjustment command, the playback progress adjustment command is sent to a dispatch daemon via the WebKit kernel process, in order to realize playback progress adjustment of the multimedia file currently played by the smart television.

In this embodiment, the smart television of the WebKit-based WebOS mainly include: a network module, including wired setting and wireless setting; a system module, including image setting, voice setting, Bluetooth setting, volume control, switch item setting (such as Dolby switch, surround sound switch), execution of Linux Shell and so on; a signal source module, configured to monitor the access and disconnection status of external devices such as HDMI, VA, S terminal, differential, RF and so on, and capable of switching to the corresponding signal source channel; a USB module, configured to monitor the plugging and unplugging status of USB external storage devices, and capable of performing operations such as browsing, playing and so on, on files in the USB storage devices; a player module, configured to realize playing and controlling of videos, music, pictures and stream medias as well as volume setting; a multi-screen interaction module, configured to realize the integration and docking with AirPlay, AirMirror, DLNA, Miracast, Samba and other functions; an IR module, configured to realize capture and distribution of remote key values; a background service module, docking with a background server, configured to mainly realize the Push message push, download, upgrade and other functions of the background server.

In the WebKit-based WebOS, all local function calling processes are divided into three categories, including:

synchronous calling process: when implementing certain functions, it's to block to wait for results before performing other operations, usually these calling processes take a short time, such as obtaining the current volume value, obtaining the television image contrast value and so on; asynchronous calling process: when implementing certain functions, it's not to block for waiting for results, but to return immediately after calling so as to continue to perform other operations, when information of result data is received then to process, usually these calling processes take a long time, such as files downloading, WiFi hotspot scan, Samba scan and so on; event listening process: it's first to register concerned events, when these events occur information will be received, then to perform event process according to the information data, usually these processes take a short time, such as users the remote, USB and so on.

Further, when the control command is a WiFi hotspots scanning command, via the WebKit kernel process calling the WiFi hotspots scanning interface, WiFi hotspots in the environment where the smart television are located, and the WiFi hotspots obtained by scanning are stored in a WiFi list.

Specifically, the SkyNet.scanAsyn( ) is called in JavaScript, the method does not block to wait for the scanning result of WiFi hotspots, and the return value only indicates that whether WiFi hotspots scanning is normally started. In fact, the codes are implemented by executing the newly added SkyNet.cpp interface in the WebKit framework. In the codes of SkyNet::scanAsyn( ) the WiFi hotspots scanning interface provided by SkyWifi.so is called. After completing the WiFi hotspots scanning, the scanning result is kept in a SkyWifiList object, and a message of completing scanning is added to the message queen of the WebKit window object. Then in the window.onmessage=function (event){ } in JavaScript, the message of completing WiFi hotspots scanning is received, and the corresponding logical processing is performed. Calling the SkyNet.scanAsyn interface in JavaScript is a typical asynchronous call process.

In this embodiment, in order to realize the function of WiFi network setting in Web applications, the network setting interface objects are extended in the WebKit kernel framework, including: defining and realizing a plugin implementing WiFi network setting, the essence of SkyWifi.so is to call interfaces of libraries such as libutils, libcutils, libnetutils and so on to implement corresponding network setting, which is a dynamic library providing functional interface callings; creating a new directory SkyWebOS, and implementing three files in the SkyWebOS directory: SkyNet.idl, SkyNet.h and SkyNet.cpp. The SkyNet.idl is an interface definition file based on the idl standard, in which SkyNet interface objects and related methods and attributes are defined. The SkyNet.h and SkyNet.cpp complete the implementation of specific functions (C++ codes omitted herein), the implementation codes in the SkyNet.cpp are calling the packaged interfaces provided by the SkyWifi.so, and relevant code files that the SkyNet.h and SkyNet.cpp rely on are also copied to the SkyWebOS directory so that it can be compiled normally. In the working directory, according to the standard format already defined, compiling is executed after the file information of the SkyNet.idl, SkyNet.h, SkyNet.cpp and so on is added, so that the extended SkyNet interface object can be recognized and called in JavaScript; (6) recompiling the WebKit to generate the latest so file. The above content clarifies how to extend the functional interface objects in the WebKit framework, so that in the Web development process, the extended functional interfaces can be conveniently called by JavaScript, thereby realizing the localization function docking.

In accordance with the embodiment, when the smart television is turned on, it's first to start a WebKit kernel process based on the Linux kernel and the driver layer, next to start a state management daemon to detect a control command received by the smart television, then to send the control command to a daemon corresponding to the control command via the WebKit kernel process, allowing the daemon to perform control operation corresponding to the control command. This realizes playing control via the WebKit kernel process sending the control command to the corresponding daemon, making the smart television adopting the WebKit-based WebOS is able to be without a middle layer, improving the playing fluency of multimedia files of the smart television.

Figure 2:
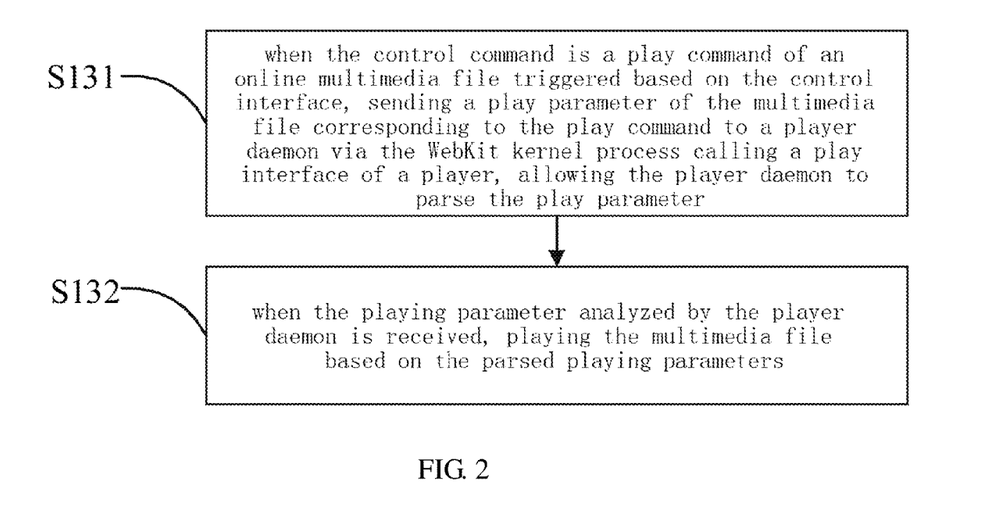
FIG. 2 is a detailed illustrative flowchart of the step of sending the control command to a daemon corresponding to the control command via the WebKit kernel process in a second embodiment of a smart television playing method according to this disclosure.

A second embodiment of a smart television playing method according to the present disclosure is provided based on the first embodiment, referring to FIG. 2, in the exemplary embodiment, the display interface of the smart television is a control interface displayed as a Web page, the step S130 includes:

S131, when the control command is a play command of an online multimedia file triggered based on the control interface, sending a play parameter of the multimedia file corresponding to the play command to a player daemon via the WebKit kernel process calling a play interface of a player, allowing the player daemon to parse the play parameter;

When the control command is a play command of an online or a local multimedia file triggered based on the control interface, namely according to the captured key value, the IR daemon determines that the key value is a play command of an online or a local multimedia file, via the WebKit kernel process calling the play interface of a player, a play parameter of the multimedia file corresponding to the play command is sent to a player daemon. Specifically, via the WebKit kernel process calling the play interface of a player, the play parameter of the multimedia file corresponding to the play command is sent to a player plugin, the player plugin sends the play parameter to a player daemon, and the player daemon parses the play parameter to obtain detailed play parameters, wherein, the play parameters include the play url, clarities, play time and so on.

S132, when the play parameter parsed by the player daemon is received, playing the multimedia file based on the parsed play parameter.

The player daemon plays the multimedia file according to the parsed play parameter, wherein, the play parameter include the play url, clarities, play time and so on.

In the playing process of the multimedia file, if the playing of the multimedia file is detected to be not fluent, such as lagging, the player daemon sends information to the dispatch daemon. The dispatch daemon displays a web interface with prompt information which may be "the playing is not fluent, please try to switch the clarity" and so on.

In this embodiment, when the control command is a play command of an online multimedia file triggered based on the control interface, via the WebKit kernel process calling the play interface of a player, play parameters of the multimedia file corresponding to the play command are sent to a player daemon, so as for the player daemon to parse the play parameters, and when the play parameters parsed by the player daemon are received, the multimedia file is played based on the parsed play parameters. This realizes playing of the online or the local multimedia file via the WebKit kernel process, further improving the playing fluency of the multimedia file of the smart television.

Figure 3:
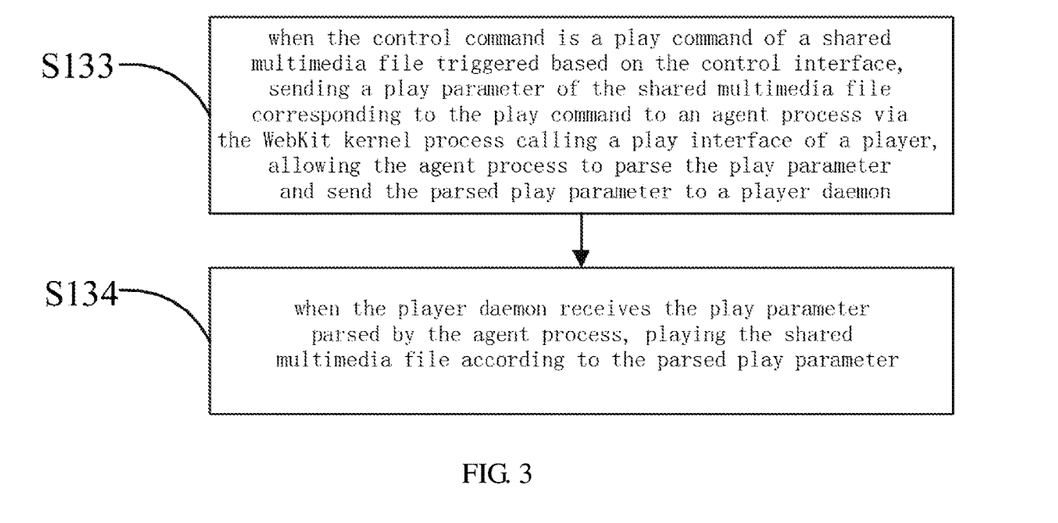
FIG. 3 is a detailed illustrative flowchart of the step of sending the control command to a daemon corresponding to the control command via the WebKit kernel process in a third embodiment of a smart television playing method according to this disclosure.

A third embodiment of a smart television playing method according to the present disclosure is provided based on the first embodiment, referring to FIG. 3, in the exemplary embodiment, the display interface of the smart television is a control interface displayed as a Web page, the step S130 includes:

S133, when the control command is a play command of a shared multimedia file triggered based on the control interface, sending a play parameter of the shared multimedia file corresponding to the play command to an agent process via the WebKit kernel process calling a play interface of a player, allowing the agent process to parse the play parameter and send the parsed play parameter to a player daemon When the control command is a play command of a multimedia file triggered based on the control interface, if the multimedia file is a shared multimedia file, namely a samba multimedia file, via the WebKit kernel process calling the play interface of a player, a play parameter of the multimedia file corresponding to the play command is sent to a player plugin, then the player plugin sends the play parameter to an agent process, the agent process parses the play parameter to obtain parameters including the play url, clarities, play time and so on, and sends the parsed play parameters to a player daemon.

S134, when the player daemon receives the play parameter parsed by the agent process, playing the shared multimedia file according to the parsed play parameter.

In this exemplary, when the control command is a play command of a shared multimedia file triggered based on the control interface, via the WebKit kernel process calling the play interface of a player, play parameters of the shared multimedia file corresponding to the play command are sent to an agent process, so as for the agent process to parse the play parameters and send the parsed play parameters to a player daemon; then when the player daemon receiving the play parameters parsed by the agent process, the shared multimedia file is played based on the parsed play parameters. This realizes playing of the shared multimedia file of the smart television via the WebKit kernel process, avoiding the problem that the player daemon can not parse play parameters of a shared multimedia file, further improving the playing fluency of the multimedia file of the smart television.

Figure 4:
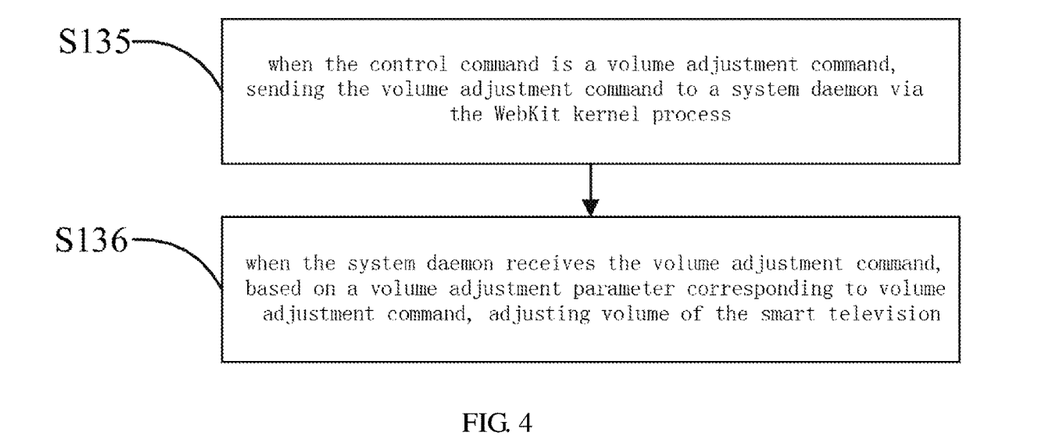
FIG. 4 is a detailed illustrative flowchart of the step of sending the control command to a daemon corresponding to the control command via the WebKit kernel process in a fourth embodiment of a smart television playing method according to this disclosure.

A fourth embodiment of a smart television playing method according to the present disclosure is provided based on the first embodiment, referring to FIG. 4, the step S130 includes:

S135, when the control command is a volume adjustment command, sending the volume adjustment command to a system daemon via a dispatch process;

In this exemplary, the IR daemon captures the key value of a remote in real time, and when the command corresponding to the key value captured by the IR daemon is a volume adjustment command, the volume adjustment command is sent to a system daemon via a dispatch daemon.

S136, when the system daemon receives the volume adjustment command, adjusting the volume of the smart television based on a volume adjustment parameter corresponding to the volume adjustment command.

For example, when the volume adjustment command is to increase volume, according to the change value corresponding to the volume adjustment command, the volume of the smart television is increased; when the volume adjustment command is to decrease volume, according to the change value corresponding to the volume adjustment command, the volume of the smart television is decreased.

In this exemplary, when the control command is a volume adjustment command, the volume adjustment command is sent to a system daemon, and when the system daemon receives the volume adjustment command, volume of the smart television is adjusted according to a volume adjustment parameter corresponding to the volume adjustment command. This realizes volume adjustment of the smart television via the WebKit kernel process, further improving the playing fluency of the multimedia file of the smart television.

Figure 5:
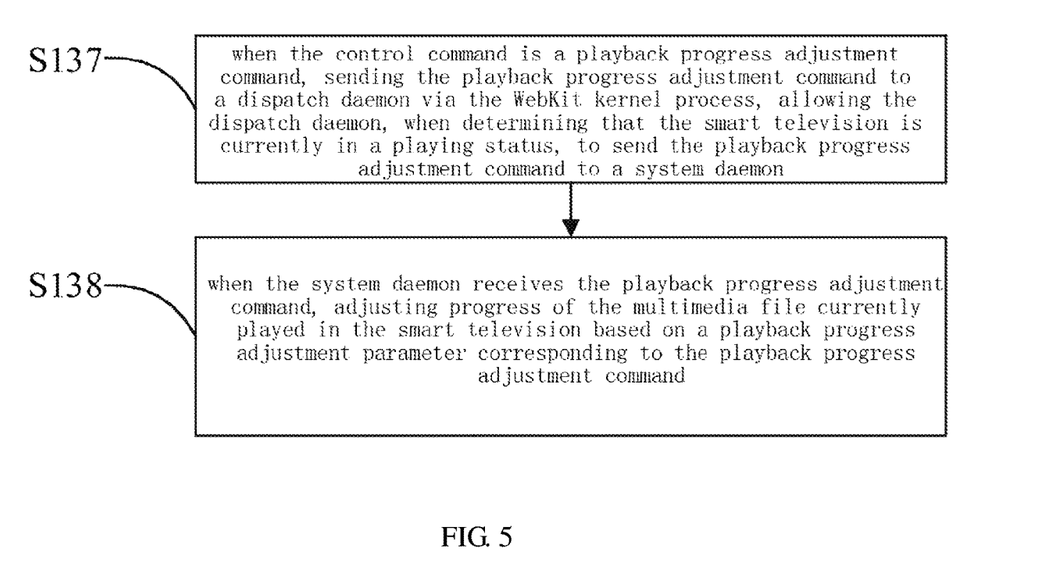
FIG. 5 is a detailed illustrative flowchart of the step of sending the control command to a daemon corresponding to the control command via the WebKit kernel process in a fifth embodiment of a smart television playing method according to this disclosure.

A fifth embodiment of a smart television playing method according to the present disclosure is provided based on the first embodiment, referring to FIG. 5, the step S130 includes:

S137, when the control command is a playback progress adjustment command, sending the playback progress adjustment command to a dispatch daemon via the WebKit kernel process, allowing the dispatch daemon, when determining that the smart television is currently in a playing status, to send the playback progress adjustment command to a system daemon;

When the control command detected by the IR daemon is a playback progress adjustment command, the playback progress adjustment command is sent to a dispatch daemon. The dispatch daemon determines whether the smart television is currently in a state of playing, and when determining that the smart television is currently in a state of playing, the dispatch daemon sends the playback progress adjustment command to a system daemon, or, when determining that the smart television is currently in a state of playing, the dispatch daemon sends information to the IR daemon to inform that the smart television is currently in a state of playing, then the IR daemon sends the playback progress adjustment command to a system daemon.

S138, when the system daemon receives the playback progress adjustment command, adjusting progress of the multimedia file currently played in the smart television based on a playback progress adjustment parameter corresponding to the playback progress adjustment command.

When the system daemon receives the playback progress adjustment command, according to a playback progress adjustment parameter corresponding to the playback progress adjustment command, progress of the multimedia file currently played by the smart television is adjusted. For example, if the playback progress adjustment parameter includes a fast forward parameter, according to the fast forward parameter, the playing progress of the multimedia file currently played by the smart television is fast forwarded, or, if the playback progress adjustment parameter includes adjustment time for fast forward or fast backward, the multimedia file is played at the time after adding or subtracting the adjustment time from the current time.

In this exemplary, when the control command detected by the IR daemon is a playback progress adjustment command, the playback progress adjustment command is sent to a dispatch daemon, so as for the dispatch daemon, when determining that the smart television is in a state of playing, to send the playback progress adjustment command to a system daemon, later when the system daemon receiving the playback progress adjustment command, based on playback progress adjustment parameters corresponding to the playback progress adjustment command, progress of the multimedia file currently played by the smart television is adjusted. This realizes progress adjustment of the multimedia file currently played by the smart television via the WebKit kernel process, further improving the playing fluency of multimedia files of smart televisions.

Figure 6:
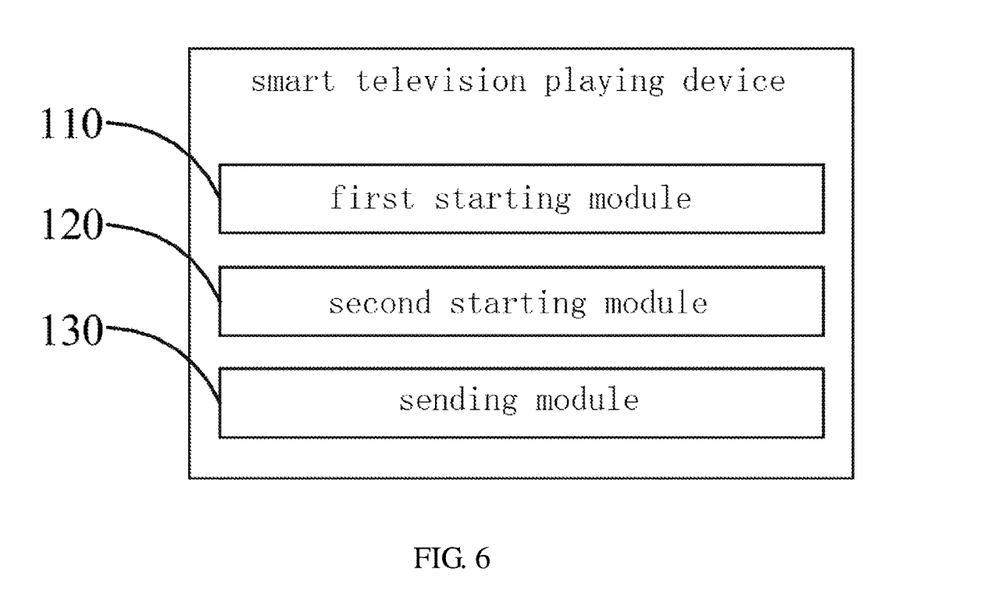
FIG. 6 is a functional module diagram of a first embodiment of a smart television playing device according to this disclosure.

The present disclosure further provides a smart television playing device. Referring to FIG. 6, FIG. 6 is a functional module diagram of a first embodiment of a smart television playing device according to this disclosure.

In the exemplary embodiment, the smart television playing device is applied to a smart television of the WebKit-based WebOS. The WebKit is an open source browser engine, based on which the WebOS (embedded operating system) of the smart television can be designed to implement. The WebOS is presented by means of Web pages to users of the smart television. All interactions of a user on the television, and all the use of functions are performed by the Web. The smart television playing device includes:

a first starting module 110, configured to, when the smart television is turned on, start a WebKit kernel process based on the Linux kernel and a driver layer;

When the smart television is turned on, the Linux kernel is started, and an initialization process is started to mount the necessary file system, and to start system services or daemons. By the initialization process, a WebKit kernel process is started, which is served as an intermediate interface for communication between the upper user space or applications and the system kernel.

In the exemplary embodiment, an IR daemon is started to capture the key value of a remote in real time. A web page of the control interface is displayed on the display interface of the smart television, the web page including options for switching selections, clarities, play sources and so on. Users can trigger a play command of a multimedia file by limiting the option such as the switching selections or play sources and so on. The IR daemon determines whether the key value is the play command of the multimedia file according to the captured key value.

a second starting module 120, configured to start a state management daemon to detect a control command received by the smart television;

a sending module 130, configured to send the control command to a daemon corresponding to the control command via the WebKit kernel process, allowing the daemon to perform control operation corresponding to the control command.

In accordance with the embodiment, when the smart television is turned on, the first starting module 110 starts a WebKit kernel process based on the Linux kernel and the driver layer, next the second starts module 120 starts an IR daemon to detect the control command received by the smart television, then the sending module 130, via the WebKit kernel process, sends the control command to a daemon corresponding to the control command, so as for the daemon to perform control operations corresponding to the control command. This realizes playing control via the WebKit kernel process sending the control command to the corresponding daemon, making the smart television adopting the WebKit-based WebOS is able to be without a middle layer, improving the playing fluency of multimedia files of the smart television.

Figure 7:
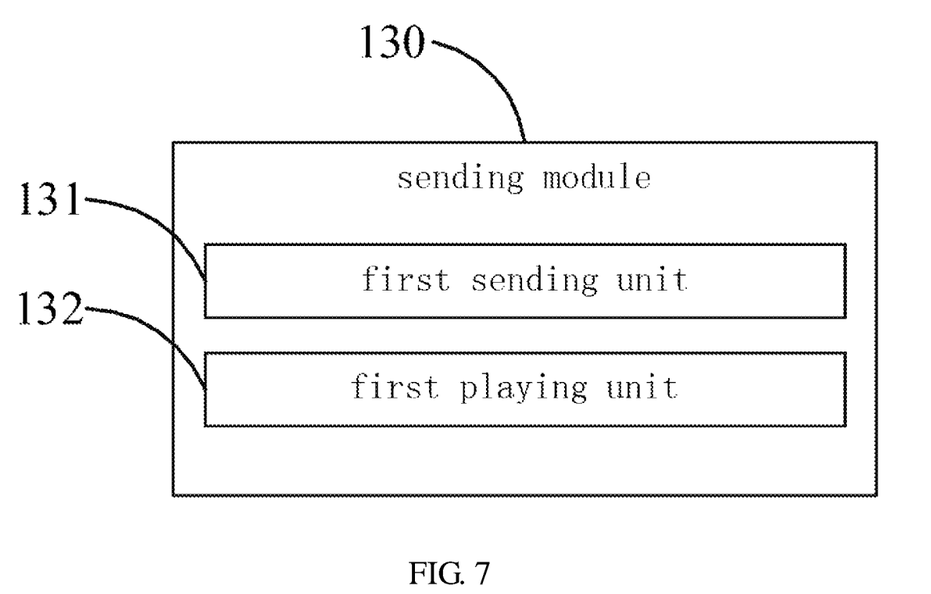
FIG. 7 is a detailed functional module diagram of sending module of a second embodiment of a smart television playing device according to this disclosure.

A second embodiment of a smart television playing device according to the present disclosure is provided based on the first embodiment, referring to FIG. 7, in the exemplary embodiment, the display interface of the smart television is a control interface displayed as a Web page. The sending module 130 includes:

a first sending unit 131, configured to, when the control command is a play command of an online multimedia file triggered based on the control interface, send a play parameter of the multimedia file corresponding to the play command to a player daemon via the WebKit kernel process calling a play interface of a player, allowing the player daemon to parse the play parameter;

When the control command is a play command of an online or a local multimedia file triggered based on the control interface, namely according to the captured key value, the IR daemon determines that the key value is a play command of an online or a local multimedia file, the first sending unit 131, via the WebKit kernel process calling the play interface of a player, sends play parameters of the multimedia file corresponding to the play command to a player daemon. Specifically, via the WebKit kernel process calling the play interface of a player, play parameters of the multimedia file corresponding to the play command are sent to a player plugin, the player plugin sends the play parameters to a player daemon, and the player daemon parses the play parameters to obtain detailed play parameters, wherein, the play parameters include the play url, clarities, play time and so on.

a first playing unit 132, configured to, when the play parameter parsed by the player daemon is received, playing the multimedia file based on the parsed play parameter.

The first playing unit 132 plays the multimedia file according to the parsed play parameters, wherein, the play parameters include the play url, clarities, play time and so on.

In this embodiment, when the control command is a play command of an online multimedia file triggered based on the control interface, the first sending unit 131, via the WebKit kernel process calling the play interface of a player, sends play parameters of the multimedia file corresponding to the play command to a player daemon, so as for the player daemon to parse the play parameters, and when the play parameters parsed by the player daemon are received, the first playing unit 132 plays the multimedia file based on the parsed play parameters. This realizes playing of online or local multimedia files via the WebKit kernel process, further improving the playing fluency of multimedia files of the smart television.

Figure 8:
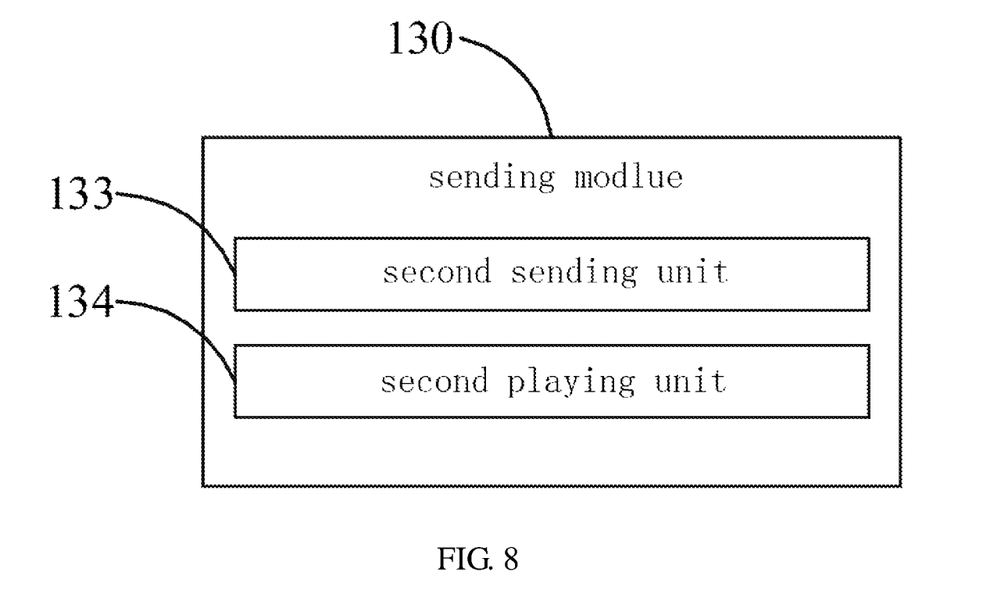
FIG. 8 is a detailed functional module diagram of sending module of a third embodiment of a smart television playing device according to this disclosure.

A third embodiment of a smart television playing device according to the present disclosure is provided based on the first embodiment, referring to FIG. 8, in the exemplary embodiment, the display interface of the smart television is a control interface displayed as a Web page. The sending module 130 includes:

a second sending unit 133, configured to, when the control command is a play command of a shared multimedia file triggered based on the control interface, send a play parameter of the shared multimedia file corresponding to the play command to an agent process via the WebKit kernel process calling a play interface of a player, allowing the agent process to parse the play parameter and send the parsed play parameter to a player daemon;

When the control command is a play command of a multimedia file triggered based on the control interface, if the multimedia file is a shared multimedia file, namely a samba multimedia file, via the WebKit kernel process calling the play interface of a player, play parameters of the multimedia file corresponding to the play command are sent to a player plugin, then the player plugin sends the play parameters to an agent process, the agent process parses the play parameters to obtain parameters including the play url, clarities, play time and so on, and sends the parsed play parameters to a player daemon.

a second playing unit 134, configured to, when the player daemon receives the play parameter parsed by the agent process, play the shared multimedia file according to the parsed play parameter.

In this exemplary, when the control command is a play command of a shared multimedia file triggered based on the control interface, via the WebKit kernel process calling the play interface of a player, play parameters of the shared multimedia file corresponding to the play command are sent to an agent process, so as for the agent process to parse the play parameters and send the parsed play parameters to a player daemon; then when the player daemon receiving the play parameters parsed by the agent process, based on the parsed play parameters, the shared multimedia file is played. This realizes playing of shared multimedia files of the smart television via the WebKit kernel process, avoiding the problem that the player daemon can not parse play parameters of a shared multimedia file, further improving the playing fluency of multimedia files of the smart television.

Figure 9:
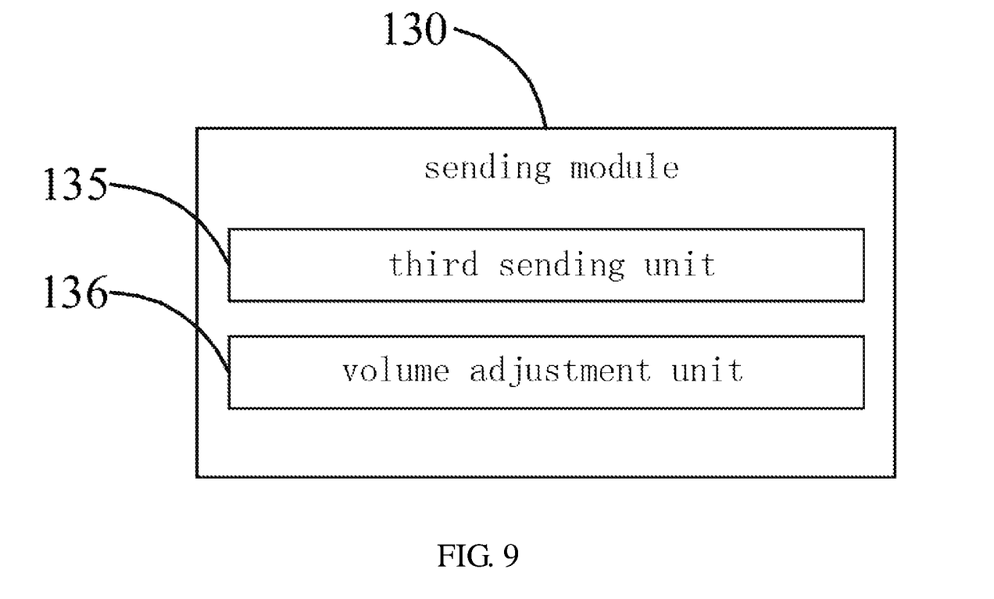
FIG. 9 is a detailed functional module diagram of sending module of a fourth embodiment of a smart television playing device according to this disclosure.

A fourth embodiment of a smart television playing device according to the present disclosure is provided based on the first embodiment, referring to FIG. 9, the sending module 130 includes:

a third sending unit 135, configured to, when the control command is a volume adjustment command, send the volume adjustment command to a system daemon via the WebKit kernel process;

In this exemplary, the IR daemon captures the key value of a remote in real time, and when the command corresponding to the key value captured by the IR daemon is a volume adjustment command, the volume adjustment command is sent to a system daemon by a dispatch daemon.

a volume adjustment unit 136, configured to, when the system daemon receives the volume adjustment command, adjust the volume of the smart television based on a volume adjustment parameter corresponding to the volume adjustment command.

For example, when the volume adjustment command is to increase volume, according to the change value corresponding to the volume adjustment command, the volume of the smart television is increased; when the volume adjustment command is to decrease volume, according to the change value corresponding to the volume adjustment command, the volume of the smart television is decreased.

In this exemplary, when the control command is a volume adjustment command, the third sending unit 135 sends the volume adjustment command to a system daemon, and when the system daemon receives the volume adjustment command, the volume adjustment unit 136 adjusts volume of the smart television according to volume adjustment parameters corresponding to the volume adjustment command. This realizes volume adjustment of the smart television via the WebKit kernel process, further improving the playing fluency of multimedia files of the smart television.

Figure 10:
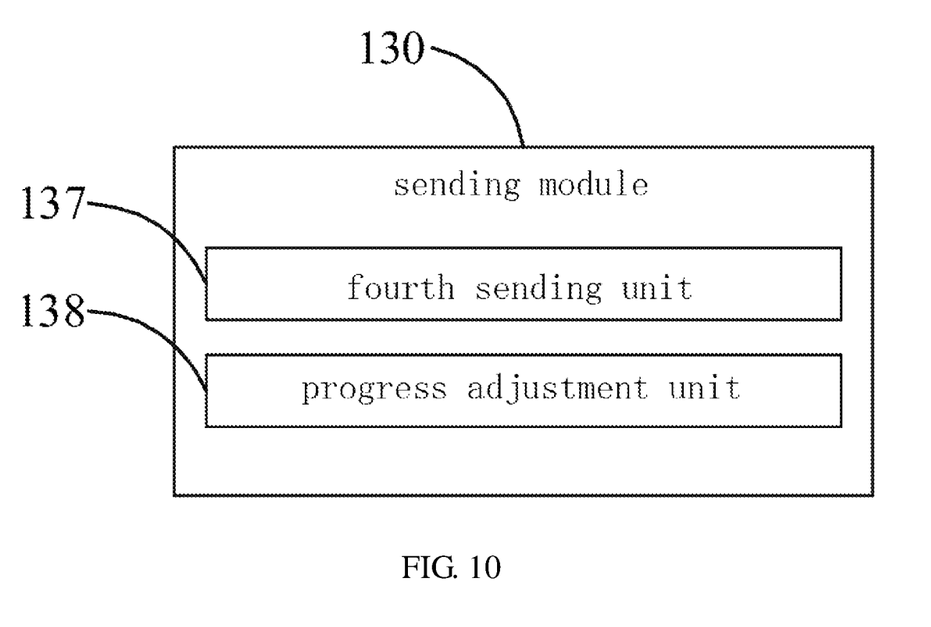
FIG. 10 is a detailed functional module diagram of sending module of a fifth embodiment of a smart television playing device according to this disclosure.

A fifth embodiment of a smart television playing device according to the present disclosure is provided based on the first embodiment, referring to FIG. 10, the sending module 130 includes:

a fourth sending unit 137, configured to, when the control command is a playback progress adjustment command, send the playback progress adjustment command to a dispatch daemon via the WebKit kernel process, allowing the dispatch daemon, when determining that the smart television is currently in a playing status, to send the playback progress adjustment command to a system daemon;

When the control command detected by the IR daemon is a playback progress adjustment command, the playback progress adjustment command is sent to a dispatch daemon. The dispatch daemon determines whether the smart television is currently in a state of playing, and when determining that the smart television is currently in a state of playing, the dispatch daemon sends the playback progress adjustment command to a system daemon, or, when determining that the smart television is currently in a state of playing, the dispatch daemon sends information to the IR daemon to inform that the smart television is currently in a state of playing, then the IR daemon sends the playback progress adjustment command to a system daemon.

a progress adjustment unit 138, configured to, when the system daemon receives the playback progress adjustment command, adjust progress of the multimedia file currently played in the smart television based on a playback progress adjustment parameter corresponding to the playback progress adjustment command.

When the system daemon receives the playback progress adjustment command, according to playback progress adjustment parameters corresponding to the playback progress adjustment command, progress of the multimedia file currently played by the smart television is adjusted. For example, if the playback progress adjustment parameters include a fast forward parameter, according to the fast forward parameter, the playing progress of the multimedia file currently played by the smart television is fast forwarded, or, if the playback progress adjustment parameters include adjustment time for fast forward or fast backward, the multimedia file is played at the time after adding or subtracting the adjustment time from the current time.

In this exemplary, when the control command detected by the IR daemon is a playback progress adjustment command, the fourth sending unit 137 sends the playback progress adjustment command to a dispatch daemon, so as for the dispatch daemon, when determining that the smart television is in a state of playing, to send the playback progress adjustment command to a system daemon, then when the system daemon receiving the playback progress adjustment command, based on playback progress adjustment parameters corresponding to the playback progress adjustment command, the progress adjustment unit 138 adjusts progress of the multimedia file currently played by the smart television. This realizes progress adjustment of the multimedia file currently played by the smart television via the WebKit kernel process, further improving the playing fluency of multimedia files of smart televisions.

The foregoing description merely portrays some illustrative embodiments in accordance with the disclosure and therefore is not intended to limit the patentable scope of the disclosure. Any equivalent structure or flow transformations that are made taking advantage of the specification and accompanying drawings of the disclosure and any direct or indirect applications thereof in other related technical fields shall all fall in the scope of protection of the disclosure.

What is claimed is:

1. A smart television playing method, applied to a smart television of the WebKit-based WebOS, the smart television playing method comprising:
when the smart television is turned on, starting a WebKit kernel process based on the Linux kernel and a driver layer, wherein the WebKit kernel is served as an intermediate interface for communication between user space and kernel space;
starting a state management daemon to detect a control command received by the smart television; and
sending the control command to a daemon corresponding to the control command via the WebKit kernel process, allowing the daemon to perform control operation corresponding to the control command.

2. The method of claim 1, wherein the display interface of the smart television is a control interface displayed as a Web page, the operation of sending the control command to a daemon corresponding to the control command via the WebKit kernel process, allowing the daemon to perform control operation corresponding to the control command, comprises:
when the control command is a play command of an online multimedia file triggered based on the control interface, sending a play parameter of the multimedia file corresponding to the play command to a player daemon via the WebKit kernel process calling a play interface of a player, allowing the player daemon to parse the play parameter; and
when the play parameter parsed by the player daemon is received, playing the multimedia file based on the parsed play parameter.

3. The method of claim 1, wherein the display interface of the smart television is a control interface displayed as a Web page, the operation of sending the control command to a daemon corresponding to the control command via the WebKit kernel process, allowing the daemon to perform control operation corresponding to the control command, comprises:
when the control command is a play command of a shared multimedia file triggered based on the control interface, sending a play parameter of the shared multimedia file corresponding to the play command to an agent process via the WebKit kernel process calling a play interface of a player, allowing the agent process to parse the play parameter and send the parsed play parameter to a player daemon; and
when the player daemon receives the play parameter parsed by the agent process, playing the shared multimedia file according to the parsed play parameter.

4. The method of claim 1, wherein the operation of sending the control command to a daemon corresponding to the control command via the WebKit kernel process, allowing the daemon to perform control operation corresponding to the control command, comprises:
when the control command is a volume adjustment command, sending the volume adjustment command to a system daemon via the WebKit kernel process; and
when the system daemon receives the volume adjustment command, adjusting the volume of the smart television based on a volume adjustment parameter corresponding to the volume adjustment command.

5. The method of claim 1, wherein the operation of sending the control command to a daemon corresponding to the control command via the WebKit kernel process, allowing the daemon to perform control operation corresponding to the control command, comprises:
when the control command is a playback progress adjustment command, sending the playback progress adjustment command to a dispatch daemon via the WebKit kernel process, allowing the dispatch daemon, when determining that the smart television is currently in a playing status, to send the playback progress adjustment command to a system daemon; and
when the system daemon receives the playback progress adjustment command, adjusting progress of the multimedia file currently played in the smart television based on a playback progress adjustment parameter corresponding to the playback progress adjustment command.

6. A smart television playing device, applied to a smart television of the WebKit-based WebOS, the smart television playing device comprising:
- a first starting module, configured to, when the smart television is turned on, start a WebKit kernel process based on the Linux kernel and a driver layer, and display a control interface of the smart television as a Web page, wherein the WebKit kernel is served as an intermediate interface for communication between user space and kernel space;
- a second starting module, configured to start a state management daemon to detect a control command received by the smart television; and
- a sending module, configured to send the control command to a daemon corresponding to the control command via the WebKit kernel process, allowing the daemon to perform control operation corresponding to the control command.

7. The device of claim 6, wherein the display interface of the smart television is a control interface displayed as a Web page, the sending module comprises:
- a first sending unit, configured to, when the control command is a play command of an online multimedia file triggered based on the control interface, send a play parameter of the multimedia file corresponding to the play command to a player daemon via the WebKit kernel process calling a play interface of a player, allowing the player daemon to parse the play parameter; and
- a first playing unit, configured to, when the play parameter parsed by the player daemon is received, playing the multimedia file based on the parsed play parameter.

8. The device of claim 6, wherein the display interface of the smart television is a control interface displayed as a Web page, the sending module comprises:
- a second sending unit, configured to, when the control command is a play command of a shared multimedia file triggered based on the control interface, send a play parameter of the shared multimedia file corresponding to the play command to an agent process via the WebKit kernel process calling a play interface of a player, allowing the agent process to parse the play parameter and send the parsed play parameter to a player daemon; and
- a second playing unit, configured to, when the player daemon receives the play parameter parsed by the agent process, play the shared multimedia file according to the parsed play parameter.

9. The device of claim 6, wherein the sending module comprises:
- a third sending unit, configured to, when the control command is a volume adjustment command, send the volume adjustment command to a system daemon via the WebKit kernel process; and
- a volume adjustment unit, configured to, when the system daemon receives the volume adjustment command, adjust the volume of the smart television based on a volume adjustment parameter corresponding to the volume adjustment command.

10. The device of claim 6, wherein the sending module comprises:
- a fourth sending unit, configured to, when the control command is a playback progress adjustment command, send the playback progress adjustment command to a dispatch daemon via the WebKit kernel process, allowing the dispatch daemon, when determining that the smart television is currently in a playing status, to send the playback progress adjustment command to a system daemon; and
- a progress adjustment unit, configured to, when the system daemon receives the playback progress adjustment command, adjust progress of the multimedia file currently played in the smart television based on a playback progress adjustment parameter corresponding to the playback progress adjustment command.

* * * * *

UNITED STATES PATENT AND TRADEMARK OFFICE
CERTIFICATE OF CORRECTION

PATENT NO. : 10,728,486 B2
APPLICATION NO. : 16/313050
DATED : July 28, 2020
INVENTOR(S) : Yanbo Fan

Page 1 of 1

It is certified that error appears in the above-identified patent and that said Letters Patent is hereby corrected as shown below:

On the Title Page

Item (22), the PCT filing date insert --January 5, 2017-- delete "October 5, 2017".

Signed and Sealed this
Seventeenth Day of November, 2020

Andrei Iancu
*Director of the United States Patent and Trademark Office*